(12) United States Patent
Higgins

(10) Patent No.: US 8,998,145 B2
(45) Date of Patent: Apr. 7, 2015

(54) PARACHUTE PACKAGE AND COMPONENTS THEREOF

(75) Inventor: John P. Higgins, Roxboro, NC (US)

(73) Assignee: North American Aerodynamics, Roxboro, NC (US)

(\*) Notice: Subject to any disclaimer, the term of this patent is extended or adjusted under 35 U.S.C. 154(b) by 1794 days.

(21) Appl. No.: 11/921,965

(22) PCT Filed: Jun. 12, 2006

(86) PCT No.: PCT/US2006/022904
§ 371 (c)(1),
(2), (4) Date: Oct. 21, 2009

(87) PCT Pub. No.: WO2006/135870
PCT Pub. Date: Dec. 21, 2006

(65) Prior Publication Data
US 2010/0032526 A1 Feb. 11, 2010

(51) Int. Cl.
*B64D 17/30* (2006.01)
*B64D 17/42* (2006.01)
*B64D 17/50* (2006.01)

(52) U.S. Cl.
CPC ............... *B64D 17/30* (2013.01); *B64D 17/50* (2013.01); *B64D 17/42* (2013.01)

(58) Field of Classification Search
USPC ........................... 244/147, 148, 151 R, 151 A
See application file for complete search history.

(56) References Cited

U.S. PATENT DOCUMENTS

| | | | |
|---|---|---|---|
| 1,521,118 A | | 12/1924 | Morgan et al. |
| 2,052,503 A | * | 8/1936 | Tricau ............................ 244/148 |
| 3,087,696 A | * | 4/1963 | Sepp, Jr. ........................ 244/148 |
| 3,436,037 A | * | 4/1969 | Stanley .................... 244/122 AB |
| 3,559,932 A | | 2/1971 | Ternes |
| 3,908,937 A | * | 9/1975 | Poynter .......................... 244/148 |
| 3,926,391 A | * | 12/1975 | Nordine ......................... 244/149 |
| 4,262,865 A | | 4/1981 | Smith |
| 4,793,575 A | * | 12/1988 | Butler ........................... 244/148 |
| 5,024,400 A | * | 6/1991 | Cloth ............................. 244/147 |
| 5,125,599 A | * | 6/1992 | Sherman ........................ 244/148 |
| 6,431,495 B1 | * | 8/2002 | Lawyer .......................... 244/149 |
| 6,824,106 B2 | * | 11/2004 | Douglas et al. ............ 244/151 R |
| 2003/0146348 A1 | * | 8/2003 | Douglas et al. ............ 244/151 R |
| 2005/0020393 A1 | * | 1/2005 | Straka et al. ................. 474/145 |

FOREIGN PATENT DOCUMENTS

WO WO 2005/046371 A2 5/2005
WO PCT/US2006/022904 1/2007

\* cited by examiner

*Primary Examiner* — Joseph W Sanderson
(74) *Attorney, Agent, or Firm* — Amster, Rothstein & Ebenstein LLP

(57) ABSTRACT

A parachute package including a harness, a reserve parachute container attached to the harness, and a main parachute container releasably secured to the harness, wherein the main and reserve parachute containers are releasably fastened together.

8 Claims, 3 Drawing Sheets

PARACHUTE PACKAGE AND COMPONENTS THEREOF

CROSS-REFERENCE TO RELATED APPLICATION

This is a U.S. national stage entry under 35 U.S.C. §371 of International Application No. PCT/US06/22904, filed on Jun. 12, 2006 and published as International Publication No. WO 2006/135870 A2 under the Patent Cooperation Treaty on Dec. 21, 2006 and republished as International Publication No. WO 2006/135870 A3 on Dec. 21, 2006.

FIELD OF THE INVENTION

The present invention relates to a parachute package and more particularly to a parachute package including a main parachute and a reserve parachute.

BACKGROUND OF THE INVENTION

A typical sport parachute system is made up of three main components: a main parachute canopy, a reserve parachute canopy and a harness/container system.

When sport jumping first started one used military surplus equipment. The main parachute was packed in the main container and attached to a harness. The main parachute was worn on the back. The reserve canopy was packed in a reserve container that was called a chest container because it was attached to the front of the harness and worn on the chest.

When parachute manufacturers started to manufacture parachute equipment specifically for sport jumpers the same configuration was used. A main parachute canopy packed in a main container was attached to a harness and worn on the back, and a reserve parachute canopy packed in a reserve container was attached to the front of the harness.

The next evolution in sport parachute equipment was to wear both the main and reserve parachute on the back. This harness/container system was called a "piggyback." With the older system the main container, reserve container and harness were three separate components. With the piggyback system the main container, reserve container and harness is one unit.

Smokejumpers may jump as many as three fires in one day. Currently they use a chestpack reserve and a main backpack. In order to save time, the smokejumper wears his harness and reserve chestpack, while the main backpack is kept in the loft or at a sub-base. This way, different main chutes may be readily substituted so that the smokejumper is able to make another jump before his main chute is repacked from the last jump. This very valuable operational feature will be lost in the new smokejumper parachute system if the standard piggyback system is adopted since both the reserve and the main chute will be in the same unit.

SUMMARY OF THE INVENTION

As it relates to jumpers in general (and the smokejumpers in particular), the present invention features a "Detachable Main System" (DMS) which addresses a major operational issue that saves time and money by allowing for the main container unit to be separated from the harness/reserve container unit.

In the present invention, the harness/reserve container is preferably one unit or sub-assembly, and the main container is a separate unit which is releasably attached. The releasable mating of units is accomplished by using two zippers (or other releasable fasteners such as snaps, Velcro, etc) attached on the right and left sides of the main container and on the right and left sides of the reserve container/harness combination. The main parachute canopy has left and right risers installed thereon and is packed into a deployment bag and placed into the main container. The main canopy is connected to the harness by attaching the left and right risers to the left and right main lift web of the harness typically using a conventional 3-ring system.

The DMS of the present invention offers the smokejumpers the new system they need. It has both the main and reserve parachute in a single assembly and at the same time retains the advantage of having separable main and reserve parachutes. Each smokejumper may be issued his own harness/reserve unit. The smokejumper easily attaches a main unit (e.g., from a conveniently maintained common supply of main units) to his own harness/reserve unit simply by connecting two (2) zippers (or other releasable fasteners) and conveniently attaching the risers to the harness. The two units may be attached, e.g., in the aircraft enroute to the fire, thereby saving valuable time.

The present invention is also useful in other applications. For example, for student training operations where repeated jumps may be taken in the same day. A new main parachute may be used each jump in conjunction with a common harness/reserve unit. This way the student or another student need not wait until the main parachute canopy is repacked before he is ready for the next jump. Also, in sport jumping, there are different disciplines, and main parachute canopies are designed specifically for the each discipline. Generally the main parachute canopy sizes and pack volumes are quite different. This requires a jumper to have a complete set of equipment for each discipline. Using the present invention, a jumper needs only one harness, one reserve container and one reserve canopy for use with a variety of different main parachute canopies, each in a main parachute container according to the present invention.

In military training, where the amount of time the aircraft is available is limited, more training jumps can be made if the jumpers do not need to interrupt their jumping to pack their main parachute after each jump. Further, particularly in special operations, it is important to have the ability to quickly change the main canopy to one that is more suitable for a particular mission, for example from one that is designed for distance flights to one that is designed for maneuverability in tight spaces.

Another advantage provided by the present invention relates to safety. Typically, when multiple parachutes are used with the same harness and reserve parachute, the parachutes are packed in a deployment bag and the risers are tied to the bag, or in some cases an outer bag for storage is used which has a Velcro tab to hold the risers in place. The problem with these conventional methods is that there is a chance that one or both riser groups including the suspension lines may become twisted as they run up to the canopy. Also, the riser may be inadvertently switched, resulting in backwards attachment of the canopy. In various exemplary embodiments of the present invention, the canopy risers are securely held in place, thereby eliminating the chance of these two problems from occurring.

In general, the various exemplary embodiments of the present invention are advantageous in any situation where it is desirable to attach another main parachute after each jump rather than repacking an already used parachute or having to change the harness and reserve parachute.

A parachute package according to an exemplary embodiment of the present invention includes a harness, a reserve parachute container attached to the harness, a main parachute container releasably secured to the harness, and means for releasably fastening together the main and reserve parachute containers.

In at least one embodiment, the releasable fastening means releasably fastens the main and reserve parachute containers together in a nested orientation.

In at least one embodiment, the releasable fastening means is at least one zipper.

In at least one embodiment, the releasable fastening means is a pair of zippers, one on each lateral side of said containers.

In at least one embodiment, the releasable fastening means is formed of Velcro.

In at least one embodiment, the releasable fastening means is formed of a plurality of stretch rings and a plurality of catches for the stretch rings.

In at least one embodiment, the main parachute container is generally U-shaped and defines a bight and two legs, in use the bight being disposed below the reserve parachute container, and the legs extending upwardly on opposite lateral sides of the reserve parachute container and being releasably fastened thereto by the releasable fastening means.

In at least one embodiment, the reserve parachute container additionally defines a substantially flat, downwardly extending apron to which the bight of the main parachute container is fastened by the releasable fastening means.

In at least one embodiment, the harness and the reserve parachute container are non-releasably secured together as a unit. Alternatively, the harness and the reserve container may be releasably secured together.

A main parachute container according to an exemplary embodiment of the present invention includes a means for releasably fastening the main parachute container to a harness of a parachute package.

A reserve parachute container according to an exemplary embodiment of the present invention includes extending elements that form a harness, and a means for releasably attaching the reserve parachute container to a main parachute container.

These and other features of this invention are described in, or are apparent from, the following detailed description of various exemplary embodiments of this invention

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompany drawing wherein.

DETAILED DESCRIPTION OF PREFERRED EMBODIMENTS

The present invention is generally directed to a parachute package including a main parachute container that is releasably attached to the other components of the parachute package. Such a constructions allows for easy replacement of the main parachute container after the main parachute is used, thus eliminating the need to repack the main parachute, and thus saving time and money in a variety of situations. It should be appreciated that the details of the components of the parachute package of the present invention are not limited to those constructions described and shown herein, and any conventional components, including conventional harnesses, quick release mechanisms, and canopy construction, may be used.

Figure 1:
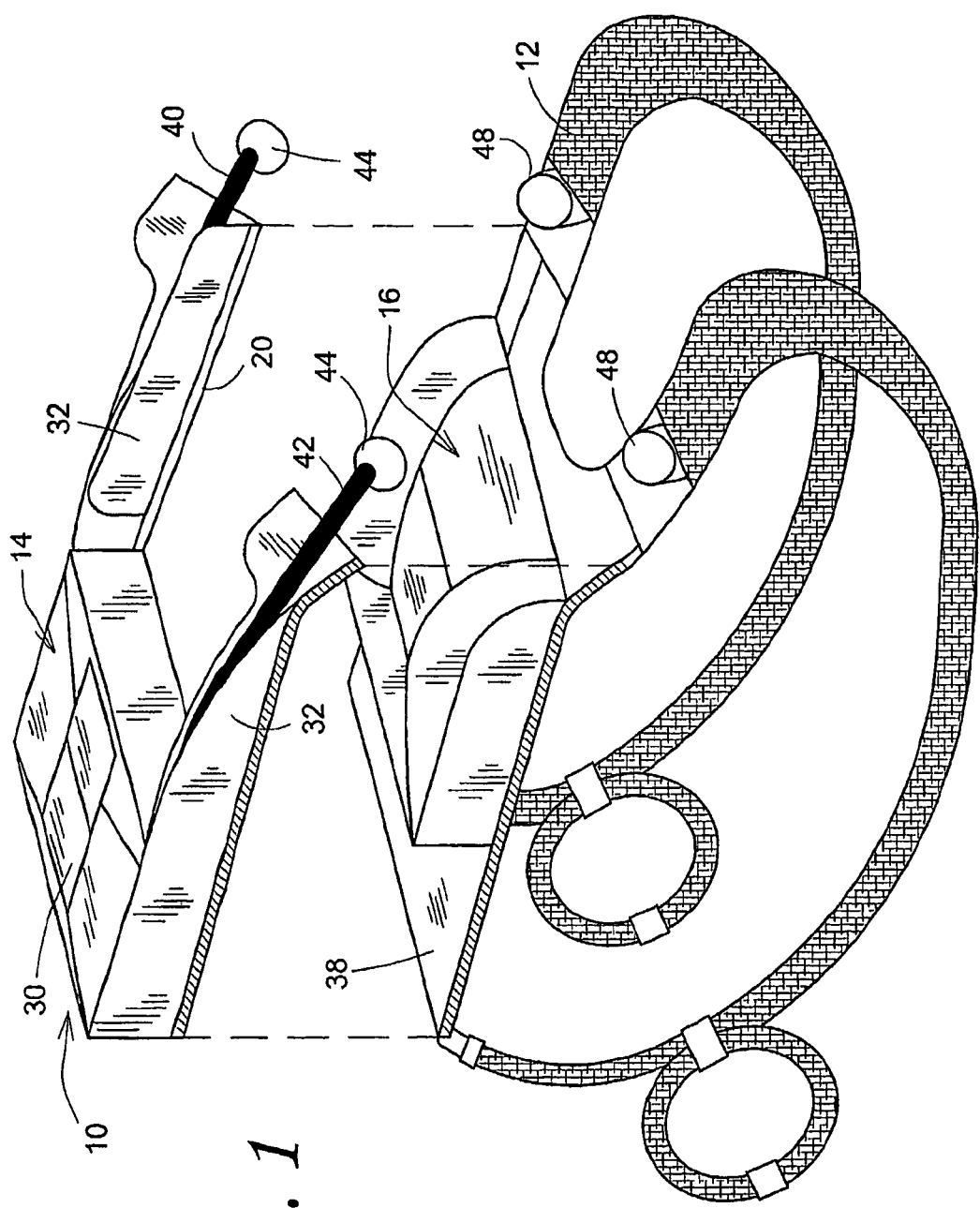
FIG. 1 is an exploded schematic isometric view illustrating the main container, the harness/reserve container and zippers used to connect the two containers.

Referring now to the drawing, and in particular FIG. 1 thereof, therein illustrated schematically is an exploded view of a parachute package according to an exemplary embodiment of the present invention, generally designated by the reference numeral 10. The package 10 includes, in addition to a substantially conventional harness 12, a main parachute container generally designated 14 including a main parachute therein (not visible) releasably attached to the harness 12, and a reserve parachute container generally designated 16 including a reserve parachute therein (not visible) and means securing the reserve parachute to the harness 12. Additionally, the package 10 includes means 20 for releasably fastening together in a nested orientation the main parachute container 14 and the reserve parachute container 16.

The main parachute container 14 is generally U-shaped and defines a bight 30 and two legs 32. In use the bight 30 is disposed below the main body of the reserve parachute container 16 and the two legs 32 extend upwardly on opposite lateral sides of the reserve parachute container 16. The legs 32 are releasably fastened to the reserve parachute container 16 by the releasable fastening means 20. Preferably the reserve parachute container 16 defines a substantially flat, downwardly extending apron 38 to which the bight 30 of the main parachute container 14 is fastened on each side by the releasable fastening means 20.

The releasable fastening means 20 is preferably a zipper, optimally a pair of zippers, one on each lateral side of the containers 14, 16 (including apron 38). Alternatively, the fastening means 20 may be snaps, Velcro (i.e., a mini-hook, mini-loop system), a plurality of stretch rings and a plurality of catches for the stretch rings, or other hardware capable of releasably fastening together two pieces of fabric. Typically, the fastener system means 20 is comprised of cooperating components, one component being secured to the main parachute container 14 and the other component being secured to the sub-assembly comprised of the harness 12 and reserve parachute container 16. Alternatively, although not shown, the other component can be secured to the harness itself.

The harness 12 and reserve parachute container 16 are non-releasably secured together as a unit, while the main parachute is releasably secured to the harness 12 either directly or via the securing means which secure the reserve parachute to the harness 12.

The present invention further encompasses, for use in the parachute package 10, a main parachute container secured to a component of the releasable fastening means 20 or a reserve parachute container 16 secured to a component of the releasable fastening means 20.

Figure 2:
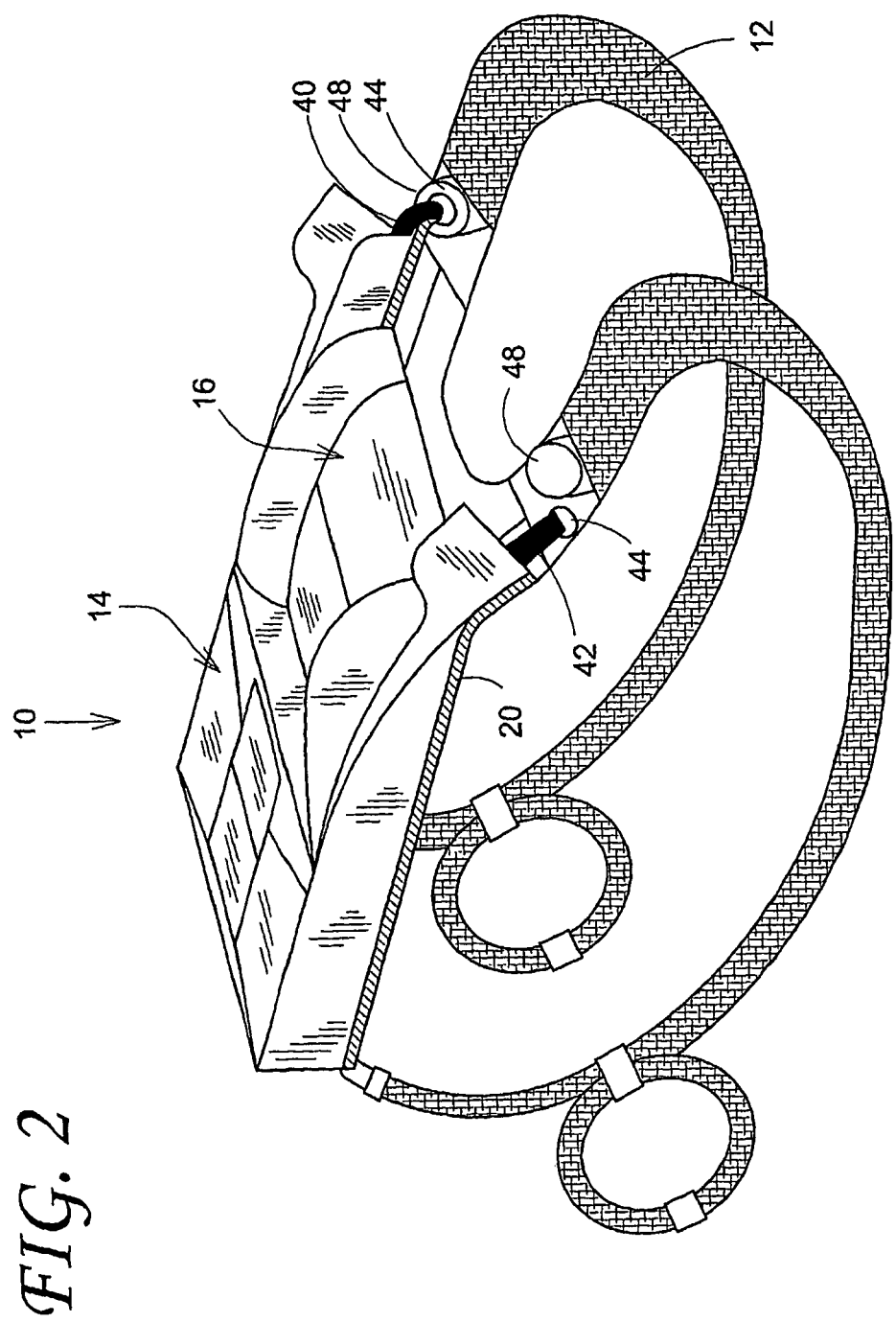
FIG. 2 is a schematic isometric view of a parachute package according to the present invention.

FIG. 2 shows the parachute package fully assembled, with the main parachute container 14 releasably attached below the reserve parachute container 16 via the releasable fastening means 20. Left and right risers 40, 42 of the main canopy extend through respective legs 32 of the main parachute container 14. Each of the risers 40, 42 terminate in respective first components 44 of left and right quick release mechanisms, generally designated by reference numbers 46 and 47, respectively. As discussed in further detail below, the first components 44 of the quick release mechanisms 46, 47 engage with respective second components 48 of the quick release mechanisms 46, 47 which are disposed on the harness 12.

Figure 3:
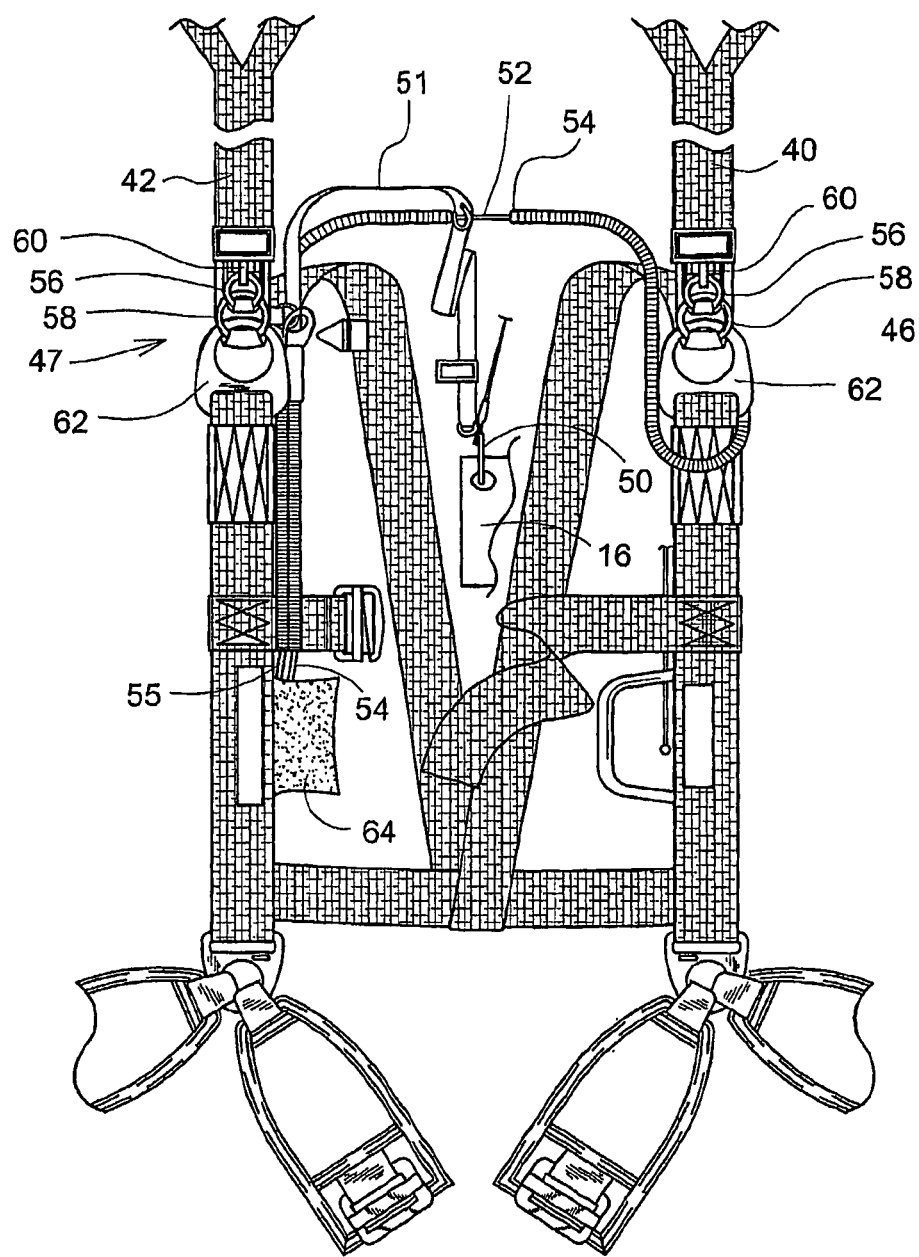
FIG. 3 is a general schematic of the parachute package showing the various connections between the harness, the risers of the main parachute and the reserve parachute container.

FIG. 3 is a general schematic of the parachute package 10 showing the various connections between the harness 12, the risers 40, 42 of the main parachute and the reserve parachute container 16. It should be appreciated that any connections conventionally known in the art of parachute pack design may be used, and the descriptions of any such connections herein are exemplary and are presented merely to fully enable the present invention. As shown in FIG. 3, the quick release mechanisms 46 for releasing the main parachute canopy in the event of a malfunction may be conventional three ring release devices. The reserve parachute container 16 includes deployment means including a closing pin 50 for initiating the deployment of the reserve parachute after the main parachute has been released. A reserve static line (RSL) 51 has a proximal end that is connected to the right riser 42 of the main parachute and a distal end that is connected to the closing pin 50 of the reserve parachute container 16. A connector ring 52 attaches a release cable 54 of the left quick release mechanism 46 to an intermediate portion of the RSL 51.

The first components 44 of the quick release mechanisms 46, 47 include a first ring 56 and a second ring 58. The first ring 56 passes through the second ring 58 for attachment thereto. A loop 60 passes through the first ring 56 and a release cable 54, 55 slidably passes through the loop 60 for releasably securing the loop 60 to the first ring 56. The second components 44 of the quick release mechanism 46, 47 include a third ring 62. The second ring 58 passes through the third ring 62 for attachment thereto. As is known in the art, particularly with conventional 3-ring connections, removal of the release cable 54, 55 from the loop 60 initiates serial release of the first ring 56 from the second ring 58, and from the third ring 62, thus releasing the riser 40, 42 from the harness 12 thereby allowing the main parachute canopy to separate from the harness so the reserve parachute may deploy without interference from the failed main parachute.

Each of the release cables 54, 55 have a proximal end positioned for operation with a handle 64 to be pulled for effecting release of the left and right risers 40, 42 from the harness 12, as the release cable 54, 55 distal ends slidably pass through the loops 52 as described. A release of both the left and right main parachute risers 40, 42 is achieved by pulling the handle 64, thus extracting the release cables 54, 55 from the loops 52 securing the three-ring release devices. The risers 40, 42 are then free to project upwardly away from the parachutist, while at the same time pulling the RSL 51 upwards which in turn eventually pulls the closing pin 50 off of the reserve parachute container 16, thereby releasing the reserve parachute.

Now that the preferred embodiments of the present invention have been shown and described in detail, various modification and improvement thereon will become readily apparent to those skilled in the art. Accordingly, the spirit and scope of the present invention is to be construed broadly and limited only by the appended claims, and not by the foregoing specification.

I claim:

1. A parachute package comprising:
   (A) a harness;
   (B) a reserve parachute container non-releasably attached to the harness, the reserve parachute container comprising a downwardly extending apron;
   (C) a main parachute container releasably secured to the harness, the main parachute container comprising a bight; and
   (D) means for releasably fastening together the main and reserve parachute containers in a nested configuration so that the bight of the main parachute container overlaps the apron of the reserve parachute container, wherein the parachute package is adapted to be worn on the back of a wearer.

2. The package of claim 1, wherein the releasable fastening means releasably fastens the main and reserve parachute containers together in a nested orientation.

3. The package of claim 1, wherein the releasable fastening means is at least one zipper.

4. The package of claim 1, wherein the releasable fastening means is a pair of zippers, one on each lateral side of said containers.

5. The package of claim 1, wherein the releasable fastening means is formed of a hook and loop fastener.

6. The package of claim 1, wherein the releasable fastening means is formed of a plurality of stretch rings and a plurality of catches for the stretch rings.

7. The package of claim 1, wherein the main parachute container is generally U-shaped and defines two legs, in use the bight being disposed below the reserve parachute container, and the legs extending upwardly on opposite lateral sides of the reserve parachute container and being releasably fastened thereto by the releasable fastening means.

8. A parachute package comprising:
   (A) a harness;
   (B) a reserve parachute container non-releasably attached to the harness, the reserve parachute container comprising a downwardly extending apron; and
   (C) a main parachute container comprising a bight and releasably secured to the reserve parachute container in a nested configuration so that the bight of the main parachute container overlaps the apron of the reserve parachute container, wherein the parachute package is adapted to be worn on the back of a wearer.

\* \* \* \* \*